(12) United States Patent
Geelen et al.

(10) Patent No.: US 8,914,224 B2
(45) Date of Patent: Dec. 16, 2014

(54) NAVIGATION DEVICE AND METHOD

(75) Inventors: Pieter Geelen, Amsterdam (NL); Kees Wesselius, Wormer (NL)

(73) Assignee: TomTom International B.V., Amsterdam (NL)

( * ) Notice: Subject to any disclaimer, the term of this patent is extended or adjusted under 35 U.S.C. 154(b) by 1186 days.

(21) Appl. No.: 12/007,377

(22) Filed: Jan. 9, 2008

(65) Prior Publication Data

US 2008/0228386 A1    Sep. 18, 2008

Related U.S. Application Data

(60) Provisional application No. 60/879,589, filed on Jan. 10, 2007.

(51) Int. Cl.
| | | |
|---|---|---|
| G08G 1/00 | (2006.01) | |
| G06F 19/00 | (2011.01) | |
| G01C 21/36 | (2006.01) | |

(52) U.S. Cl.
CPC ......... *G01C 21/367* (2013.01); *G01C 21/3673* (2013.01)
USPC ....................................... 701/117

(58) Field of Classification Search
None
See application file for complete search history.

(56) References Cited

U.S. PATENT DOCUMENTS

| | | | | |
|---|---|---|---|---|
| 5,067,081 A | * | 11/1991 | Person ........................ | 701/202 |
| 7,068,163 B2 | * | 6/2006 | Sari et al. ................ | 340/539.13 |
| 7,609,172 B2 | * | 10/2009 | Rozum et al. ................ | 340/901 |
| 2004/0167706 A1 | * | 8/2004 | Becker ........................ | 701/206 |
| 2004/0243306 A1 | | 12/2004 | Han | |
| 2005/0261822 A1 | | 11/2005 | Wako | |
| 2005/0270311 A1 | | 12/2005 | Rasmussen et al. | |

FOREIGN PATENT DOCUMENTS

| | | |
|---|---|---|
| EP | 0532158 | 3/1993 |
| EP | 0884711 | 12/1998 |
| JP | 2001158538 A | 6/2001 |
| JP | 2001159538 | 6/2001 |
| JP | 2002310715 A | 10/2002 |
| JP | 2003232648 A  * | 8/2003 |
| JP | 2006275583 A | 10/2006 |
| JP | 2006275823 A | 10/2006 |
| TW | 200406592 A | 5/2004 |

OTHER PUBLICATIONS

International Search Report issued Apr. 28, 2008 for International Application No. PCT/EP2008/000183.

* cited by examiner

*Primary Examiner* — Paul Danneman

(57) ABSTRACT

This invention relates to a navigation device (200) comprising: a processor (210) that is configured to generate a navigation map of a local environment (497); and a display (240) controllable by said processor (200) to display said navigation map and any markers (489) that relate to marked locations within said local environment (497); characterized in that the navigation device (200) further comprises: an indicator generation module (490) for generating an indicator (491) for each of any marked locations outside of said local environment, said processor (210) being responsive to said indicator generation module (490) to control said display (240) to display any generated indicators (491) in said navigation map (497).

A method of generating a navigation map and a computer program are also disclosed.

22 Claims, 16 Drawing Sheets

NAVIGATION DEVICE AND METHOD

PRIORITY STATEMENT

The present application hereby claims priority under 35 U.S.C. § 119(e) on U.S. Provisional Patent Application No. 60/879,589 filed Jan. 10, 2007, the entire contents of which is hereby incorporated herein by reference.

FIELD OF THE INVENTION

This invention relates to navigation devices and to methods for displaying navigation maps. Illustrative embodiments of the invention relate to portable navigation devices (so-called PNDs), in particular PNDs that include Global Positioning System (GPS) signal reception and processing functionality. Other embodiments relate, more generally, to any type of processing device that is configured to execute navigation software so as to provide route planning, and preferably also navigation, functionality.

BACKGROUND TO THE INVENTION

Portable navigation devices (PNDs) that include GPS (Global Positioning System) signal reception and processing functionality are well known and are widely employed as in-car or other vehicle navigation systems.

In general terms, a modern PNDs comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the 720T model manufactured and supplied by Tomtom International B.V., provide a reliable means for enabling users to navigate from one position to another.

However, one problem with these existing devices is that whilst it is easy for a user to orientate the direction in which their destination lies (relative to their start position) when looking at a relatively low magnification generated map (i.e. a map of a relatively large area), at this level of magnification the detail associated with the map (such as names of road, or particular road layouts) is lost.

Conversely, at higher levels of map magnification where the user of the device is provided with detailed information (such as street names and pseudo three-dimensional renderings of road layouts) concerning the immediate vicinity of the device, any information concerning roads or other points of interest lying outside of the particular region of the map displayed at the time (such as the final destination for example) is lost.

FIGS. 5 and 6 of the accompanying drawings illustrate this problem. In FIG. 5 there is shown a relatively low magnification depiction of a notional route 400 from a start point (a marked location) denoted by the arrow marker 410 in Parliament Square, London to a destination (another marked location) denoted by the flag marker 420 at the Aintree racecourse near Liverpool. As shown in FIG. 5, the relative position of the destination marker with respect to the start marker is clearly represented to the user (namely the destination marker is north of and to the west of the start marker).

However, when the user commences their journey the route is depicted in higher magnification (the default (for vehicle guidance) higher magnification being shown in FIG. 6), and at this magnification the user is not provided with any information as to relative position of the destination with respect to the start.

This problem is not limited solely to destinations, but also applies to points of interest and other marked locations en route, and also applies when the device is being used in a "free driving" mode. For example, referring again to FIG. 6 and to FIG. 7 (FIG. 7 being a similar view to that shown in FIG. 6 but at a lower map magnification) the user is unaware from the view provided in FIG. 6 that, as shown in FIG. 7, there are points of interest—in this instance a car park 430 and cash dispensers 440—relatively close by.

Of course, it is eminently possible for the user to control the device to reduce the map magnification and hence display a greater proportion of the map in the display of the device, but it is inconvenient for the user to repeatedly move between different levels of map magnification—even with functionality that automatically returns the view back to the original view a short period of time after a reduced magnification map has been displayed.

Furthermore, in the particular example of a user who has the device mounted in their vehicle, manipulating map views whilst the vehicle is moving is distracting to the user (who should actually be concentrating on driving the vehicle) and hence could potentially be dangerous.

In another scenario, when a user of the device (or indeed any type of computing device that has some sort of route planning and navigation instruction generation function) at a given position operates the device to browse away from their current position (i.e. so that the device generates maps that do not include the device's current position), it can be difficult for the user to remember in which direction they need to browse the map to move backwards towards their initial position.

It is an aim of the present invention to address these problems.

SUMMARY OF THE INVENTION

In pursuit of this aim, a presently preferred embodiment of the present invention provides a navigation device comprising: a processor that is configured to generate a navigation map of a local environment; and a display controllable by said processor to display said navigation map and each of any one or more markers for marked locations within said local environment; characterised in that the navigation device further comprises: an indicator generation module for generating an indicator for each of any one or more marked locations outside of said local environment, said processor being responsive to said indicator generation module to control said display to display any generated indicators in said navigation map.

Another presently preferred embodiment of the present invention provides a method of displaying a navigation map, the method comprising the steps of: generating a navigation map of a local environment; determining whether said local environment includes any marked locations, and retrieving for each of any one or more marked locations determined to be within said local environment a marker for display; determining whether there are any marked locations outside of said local environment, and generating for each of any one or more marked locations that are determined to be outside of said local environment an indicator for display; and displaying said navigation map, any said markers and any said indicators.

Yet another presently preferred embodiment of the present invention relates to computer software comprising one or more software modules operable, when executed in an execution environment, to cause a processor to: generate a navigation map of a local environment; determine whether said local environment includes any marked locations, and retrieve for each of any one or more marked locations determined to be within said local environment a marker for display; determining whether there are any marked locations outside of said location environment; and generate for each of any one or more marked locations that are determined to be outside of said local environment an indicator for display; and control a display to display said navigation map, any said markers and any said indicators.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF PREFERRED EMBODIMENTS

Preferred embodiments of the present invention will now be described with particular reference to a PND. It should be remembered, however, that the teachings of the present invention are not limited to PNDs but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

Figure 1:
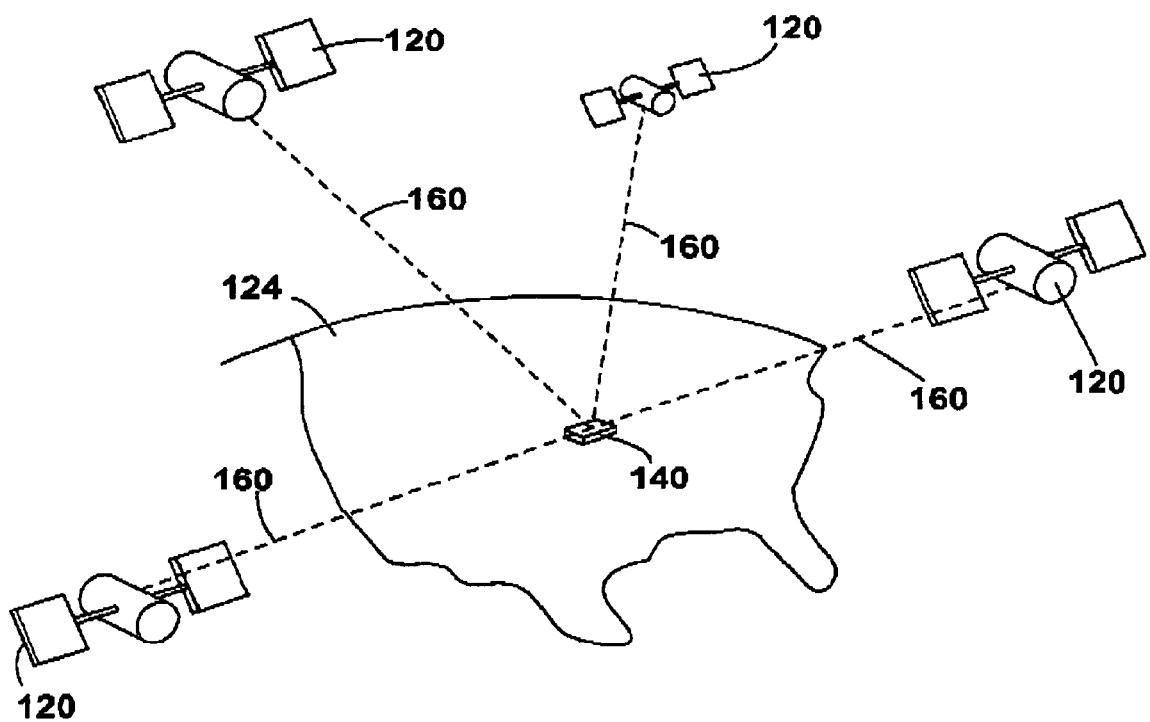
FIG. 1 is a schematic illustration of a Global Positioning System (GPS)

FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
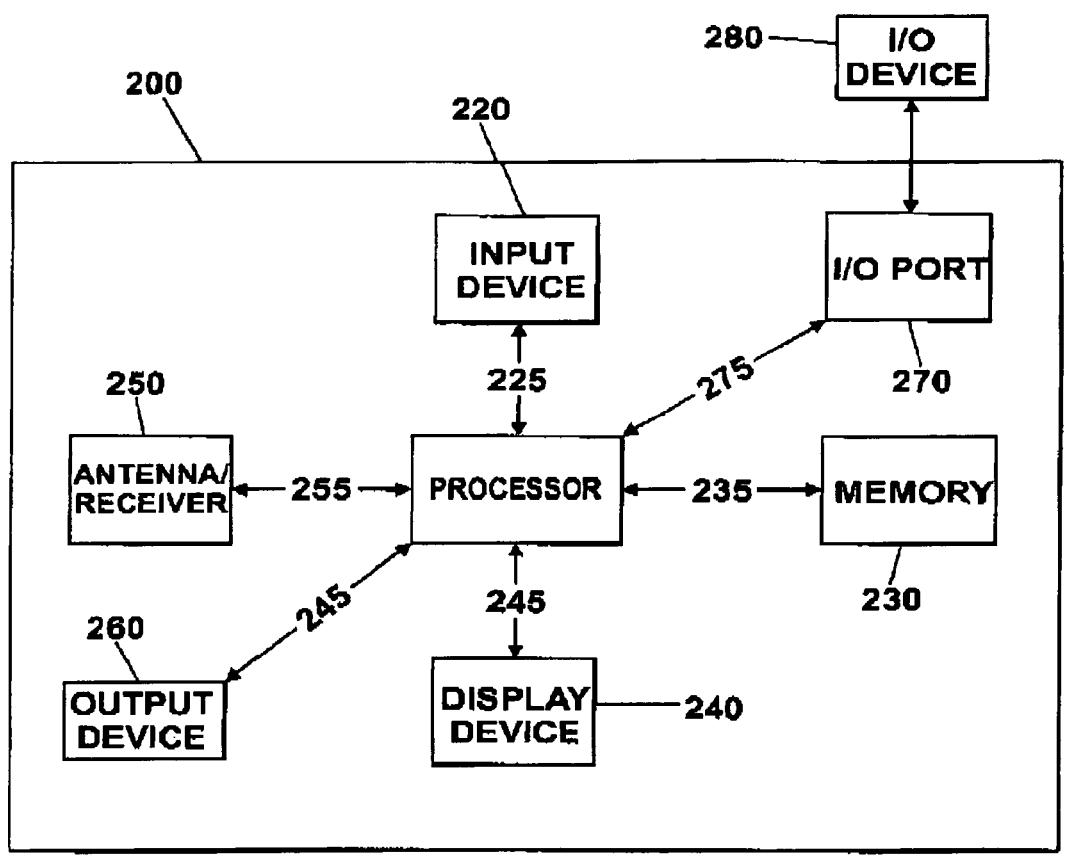
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operatively connected to memory 230 via connection 235 and is further adapted to receive/send information from/to input/output (I/O) ports 270 via connection 275, wherein the I/O port 270 is connectible to an I/O device 280 external to the navigation device 200. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
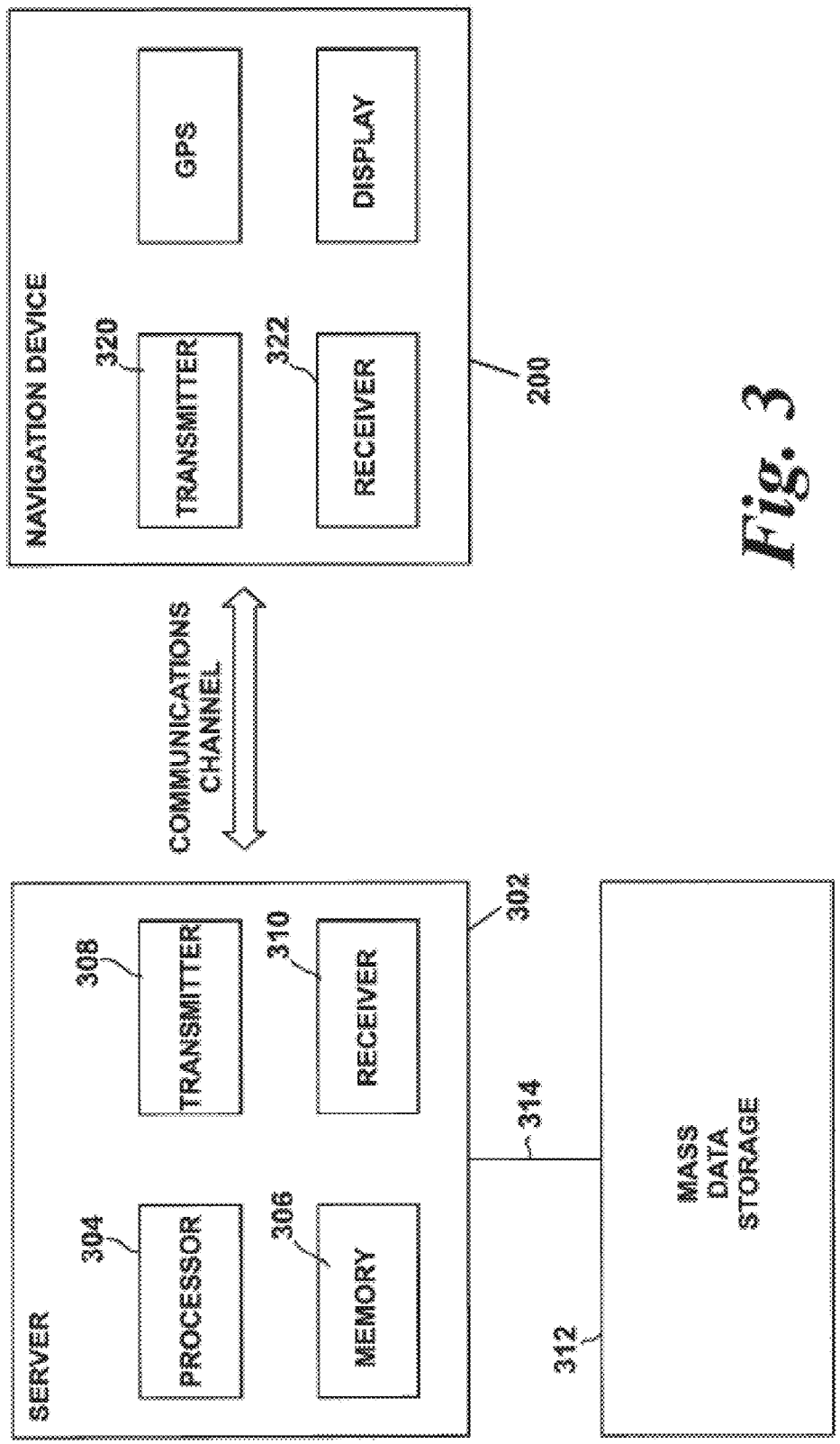
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GRPS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4A:
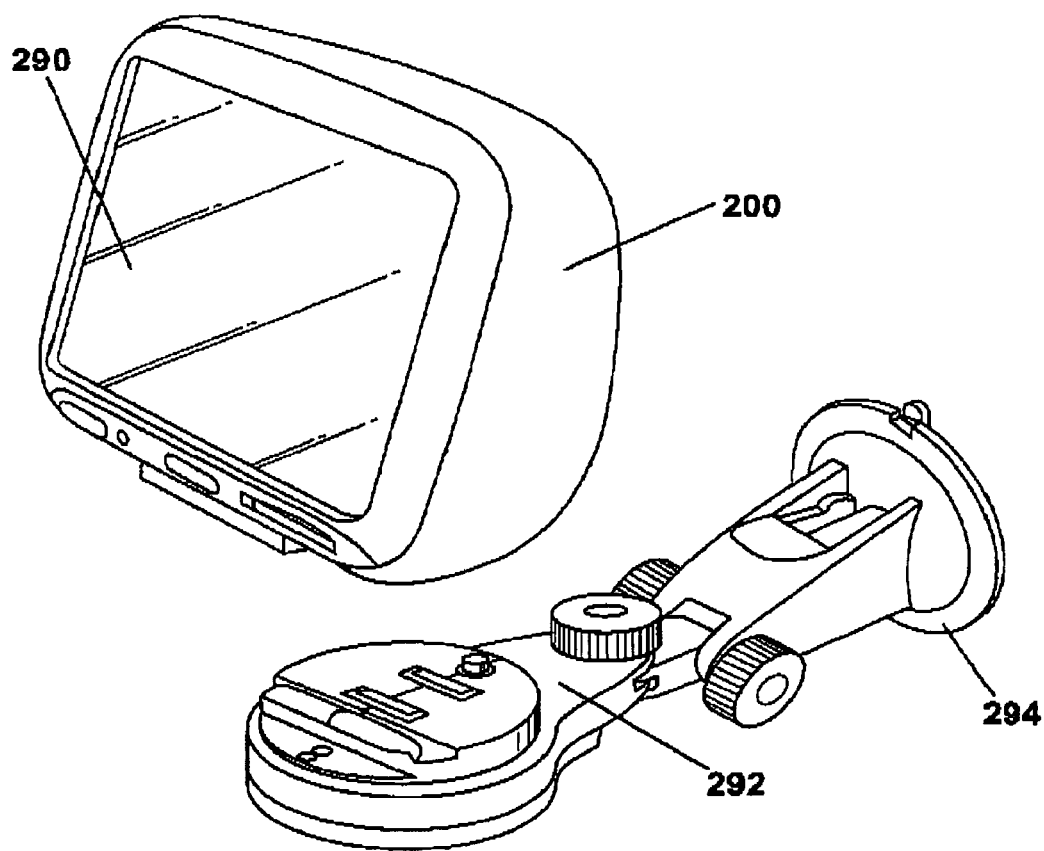
FIGS. 4A and 4B are illustrative perspective views of a navigation device.
Figure 4B:
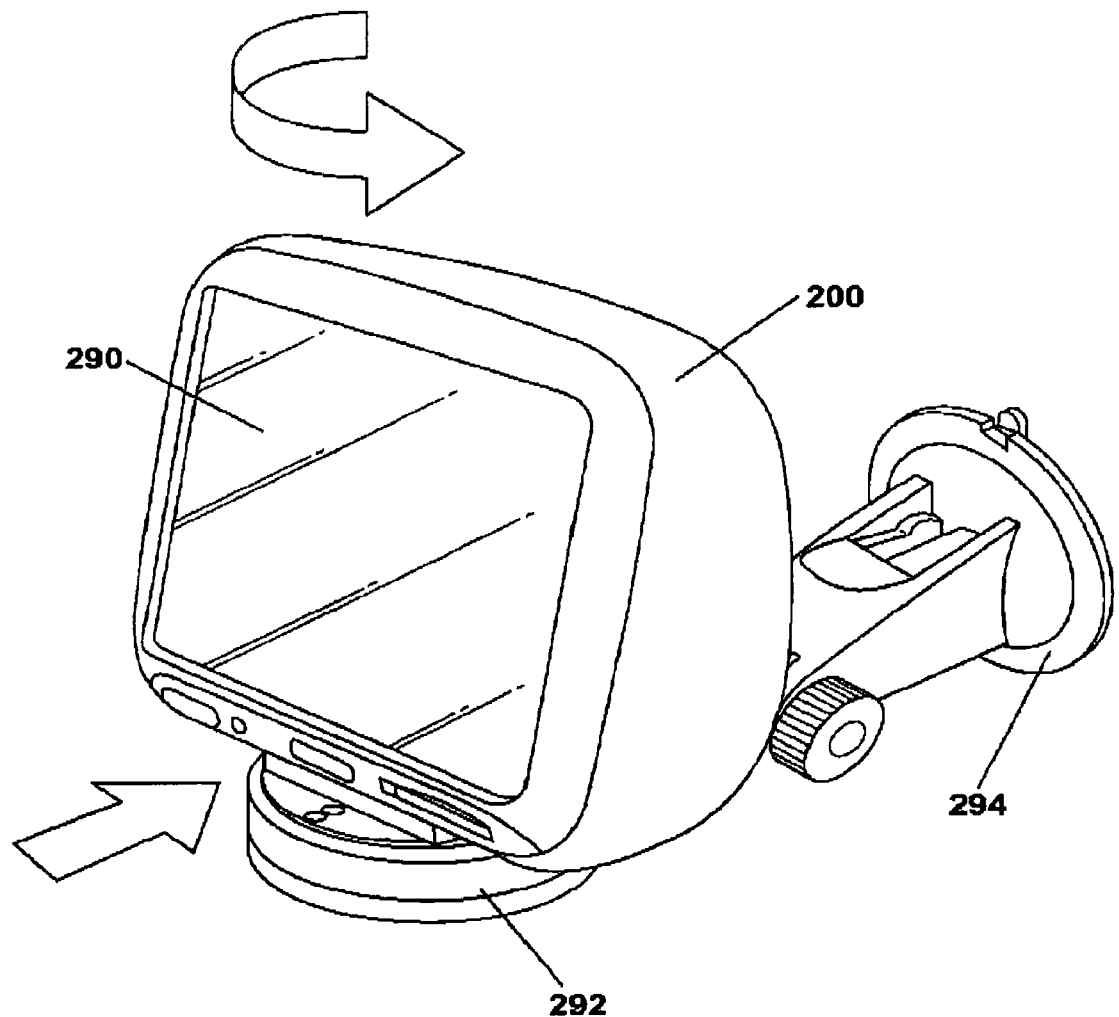
Figure 5:
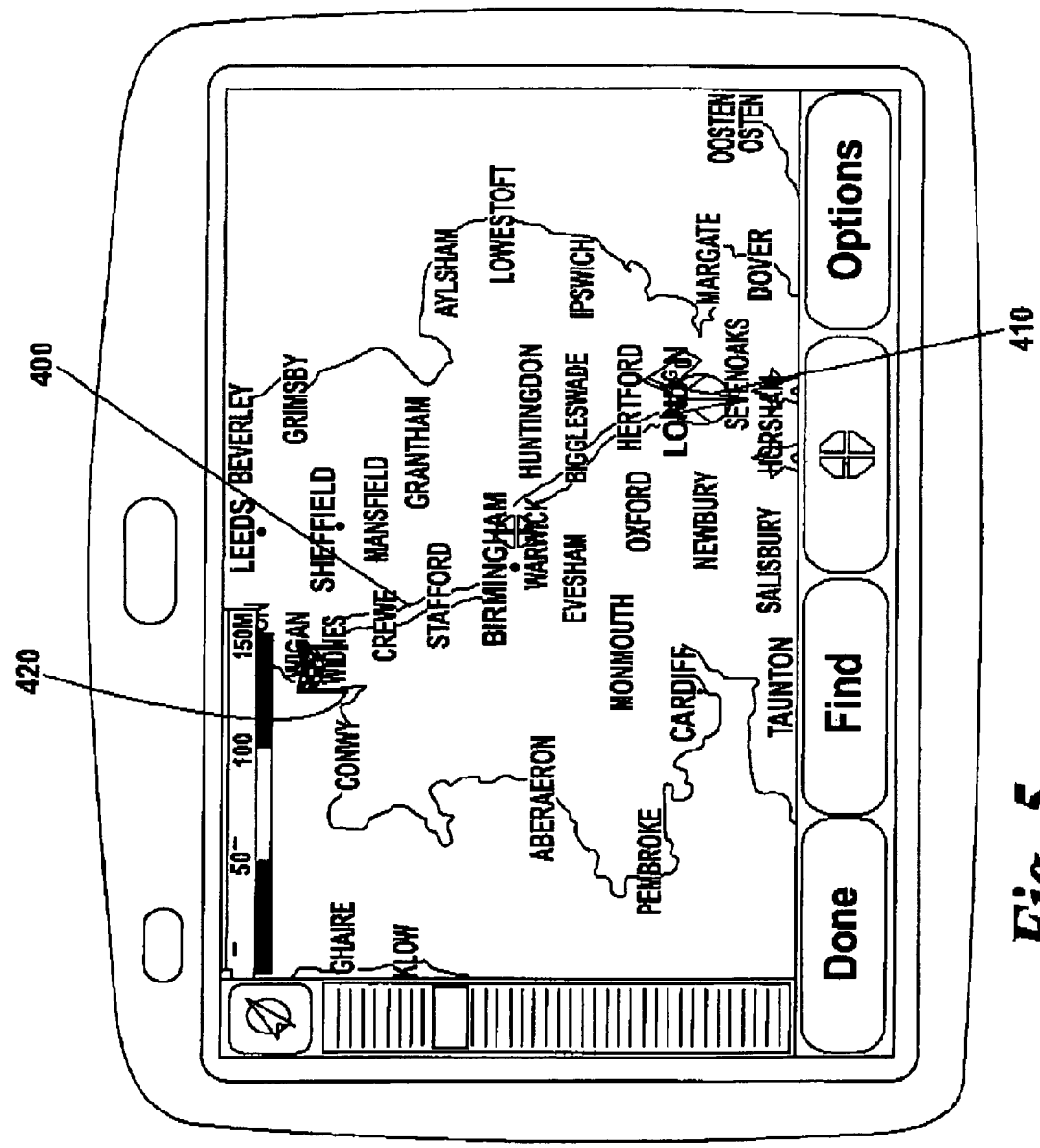
FIG. 5 is a schematic representation of an illustrative navigation route at a low level of magnification.
Figure 6:
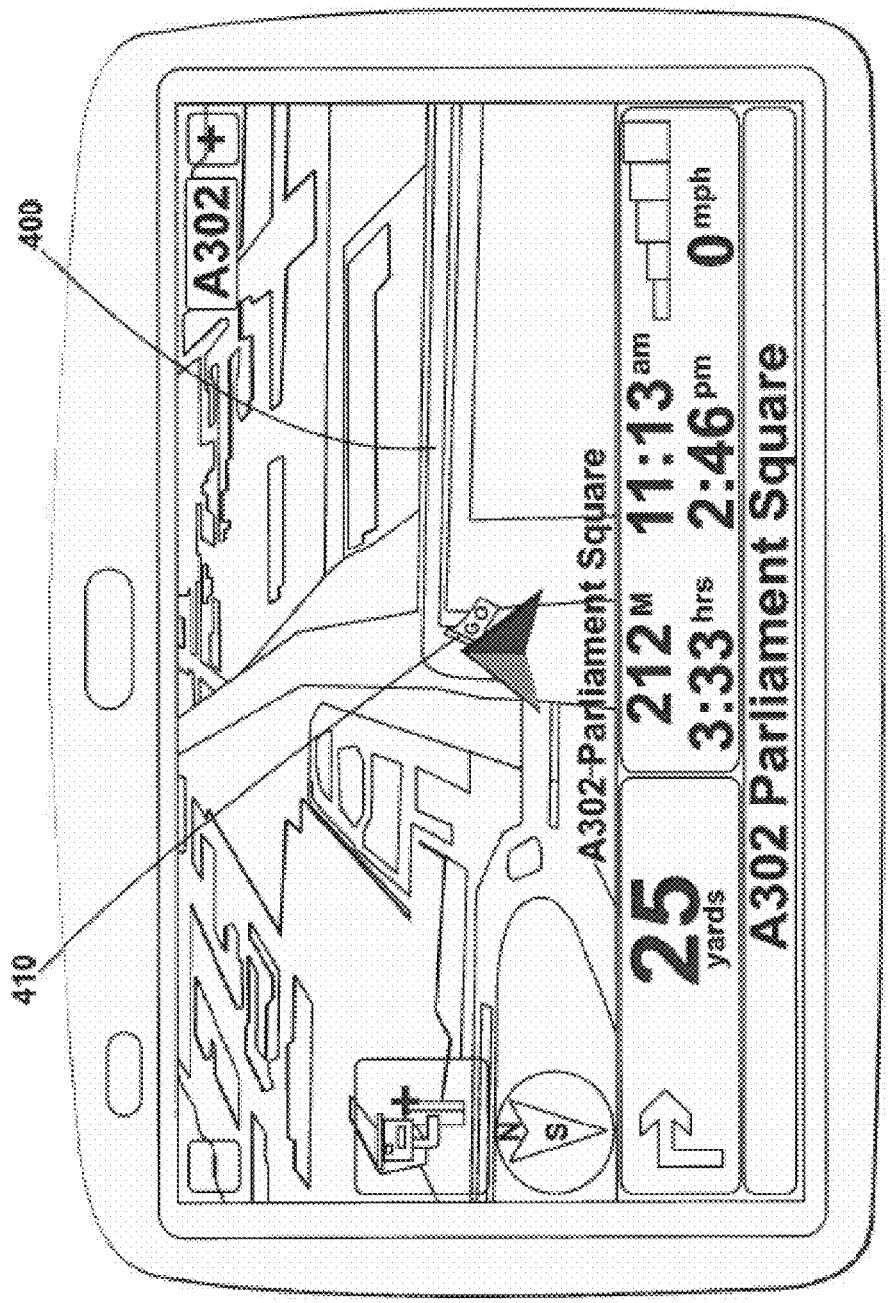
FIG. 6 is a schematic representation of part of an illustrative navigation route at a higher default level of magnification for vehicle guidance.
Figure 7:
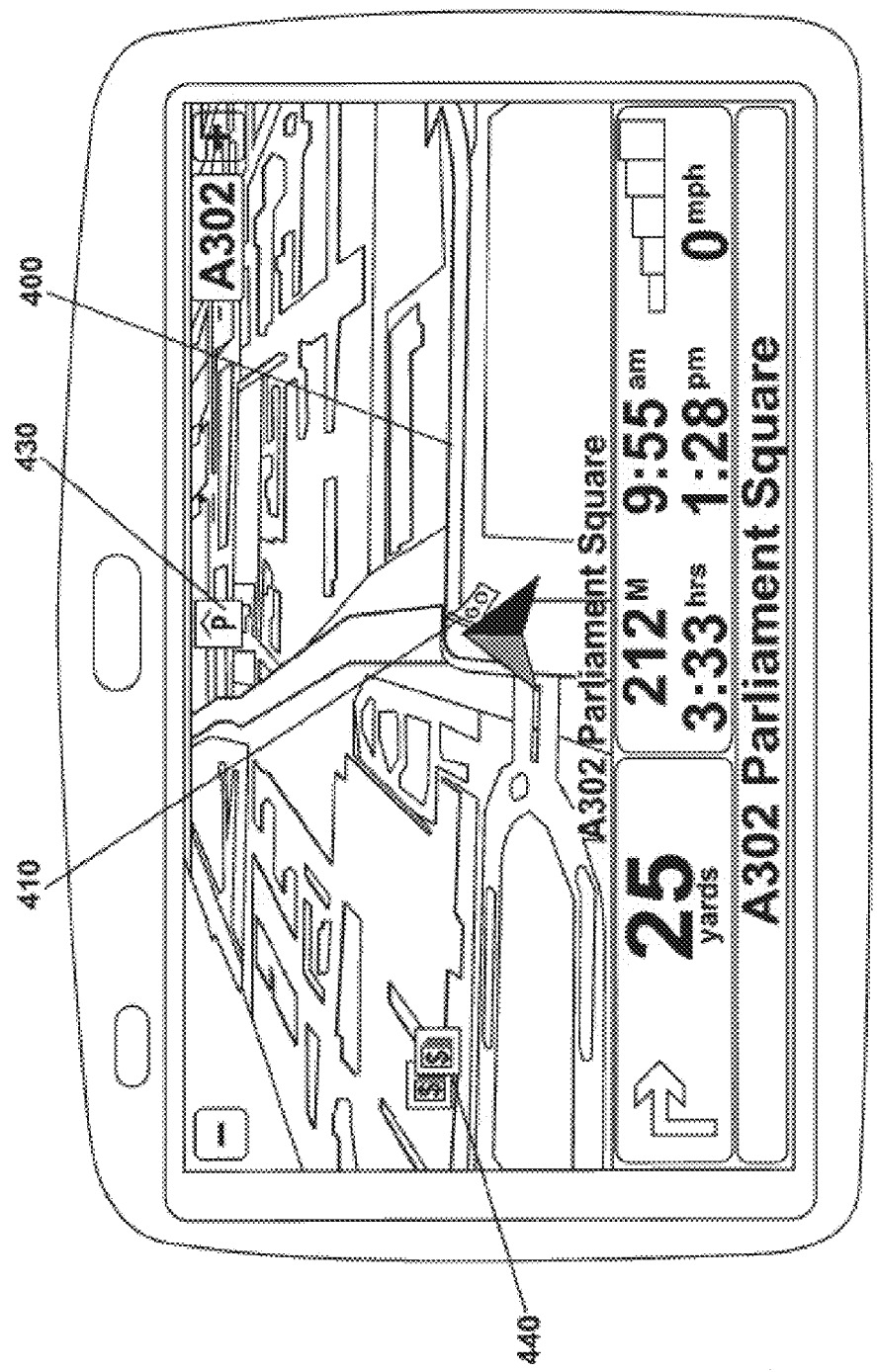
FIG. 7 is a schematic representation the part of the illustrative navigation route depicted in FIG. 6 at a lower level of magnification.

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example. The navigation device 200 may then be rotatable on the arm 292, as shown by the arrow of FIG. 4B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Figure 8:
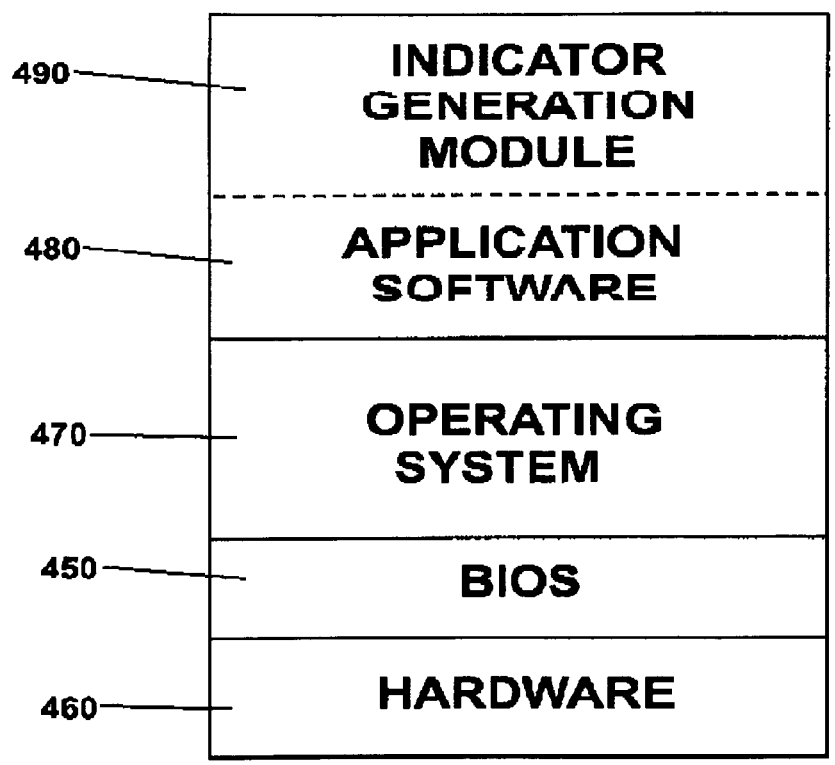
FIG. 8 is a schematic representation of the software employed by the navigation device.

Referring now to FIG. 8 of the accompanying drawings, the processor 210 and memory 230 cooperate to establish a BIOS (Basic Input/Output System) 450 that functions as an interface between the functional hardware components 460 of the navigation device 200 and the software executed by the device. The processor then loads from memory 210 an operating system 470 which provides an environment in which application software 480 (implementing some or all of the abovedescribed functionality) can run. In accordance with the preferred embodiment of the present invention, part of this functionality comprises an indicator generation module 490, the function of which will now be described in detail.

The navigation device is configured to generate—in a known manner—a navigation map for display that is representative, in one mode of use, of the local environment in which the navigation device is currently located. If the navigation device is being used to route a vehicle, then the displayed navigation map may depict part of a calculated route between a start point and a destination. Alternatively, if the device is being used in the aforementioned "free driving" mode the displayed map may simply depict the local environment in which the device is currently located. In yet another mode of use, the device may be employed to allow a user to browse maps and in this mode there may be no current location of the device, and instead the user may be prompted to input a start location for map display or map display may automatically commence from a predefined location—such as the user's home location for example.

As aforementioned, at higher levels of magnification the local environment depicted in the displayed map includes information defining the roads (for example shape and name) as well as markers for map locations such as a start position, a destination, a way point, points of interest (illustrative examples of which are petrol stations, cash dispensers, tourist attractions and any other location that might be of interest to the user of the device), or any other selected map location.

Typically a user of the device will be able to choose which of these markers are displayed, particularly in the case of points of interest where the user may be provided with the ability to select which of the displayable points of interest are actually included in the displayed map.

As the position of the device changes (for example because the vehicle in which the device is located moves from one position to another), the processor recalculates the map based on received positional information and stored map data, and renders a new map for display on said display. The device may be configured to update the displayed map with each positional calculation, or in another arrangement may be configured to update the displayed map only when the received positional information indicates that the device is approaching a boundary of the displayed map.

As aforementioned, a problem with existing devices is that at higher map magnifications information relating to marked locations that are in actuality relatively close to the device's current position but nevertheless outside of the displayed local environment, are not shown on the map and hence may be missed by the user. Also, without knowing the direction of the destination and/or start point it is easy for the user to become disorientated.

In general terms, the indicator generation module 490 is configured to alleviate these technical problems by generating one or more indicators that are each related to a marker for a location that is outside of the currently depicted navigation map and which is then displayed, preferably superimposed, on the displayed navigation map. In one envisaged operating mode the navigation map may be of a local environment in which the navigation device is currently located.

Figure 9A:
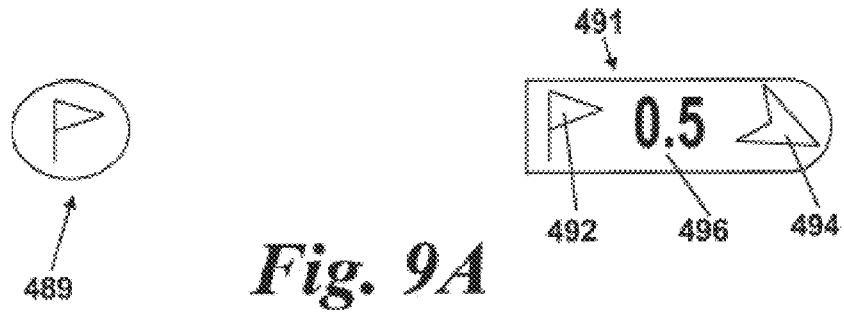
FIGS. 9a to 9d are schematic representations of illustrative markers and corresponding indicators.
Figure 9B:
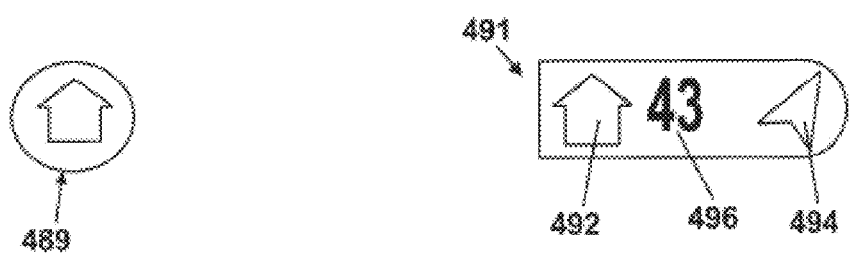
Figure 9C:
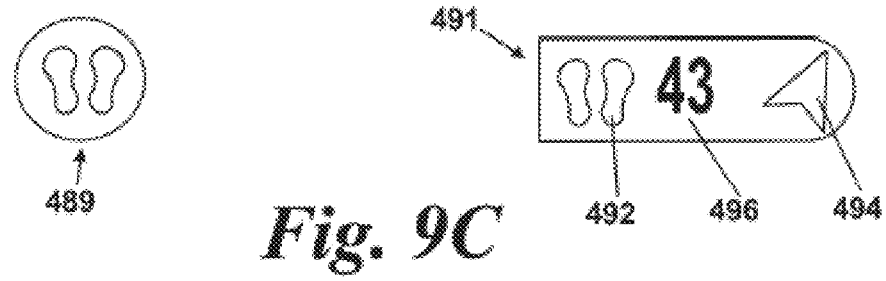

FIGS. 9a to 9d show some illustrative indicators 491 that may be generated by the indicator generation module 490 and for comparison the corresponding marker 489 that is shown when the marked location is within the displayed map. The indicators depicted in these figures each comprise a sign (which is configured to look like a signpost in the preferred arrangement) that incorporates a number of information elements. FIG. 9a shows (on the left hand side) a green location marker for a user defined location (a so-called "flag") that is displayed when the location is within the displayed map. On the right hand side of FIG. 9a, there is depicted an illustrative green indicator for the same user defined location that is displayed when the location is outside of the displayed map. FIG. 9b shows (on the left hand side) a yellow location marker for a home location (which may be a user defined position corresponding, for example, to the user's home address) that is displayed when the home location is within the displayed map. On the right hand side of FIG. 9b, there is depicted an illustrative yellow indicator for the same home location that is displayed when the location is outside of the displayed map. FIG. 9c shows (on the left hand side) a light blue location marker for a location at which a GPS fix was last obtained (typically the current or last known position of the device) that is displayed when the location is within the displayed map. On the right hand side of FIG. 9c, there is depicted an illustrative light blue indicator for the same location that is displayed when the location is outside of the displayed map. In a particularly preferred embodiment, the colour of this last marker may be configured to change (for example to grey) when contact with GPS satellites has been lost (for example because the user has taken the device into a building), and the location of the marker corresponds to that of the last obtained GPS fix.

Figure 9D:
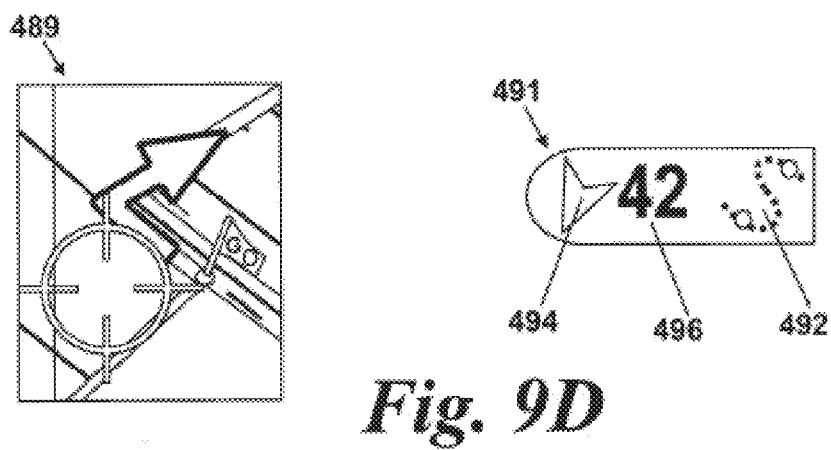

On the left of FIG. 9d there is shown a schematic representation of a waypoint as it would appear in a two-dimensional navigation map. Waypoints are points in a computed route where, for example, a change in route where a user must turn off one road and onto another. The corresponding red waypoint indicator (shown on the right of FIG. 9d) always refers to the next closest waypoint on the current route between the current GPS position (not the centre of the display) and the closest waypoint on the active trail. If there is no active route, or if the next waypoint is more than a predefined distance away (for example more than 999 miles or kilometres away), then the device is set by default not to display this indicator.

Similar markers and indicators may be defined for locations such as the location from which navigation started (the so-called start point), the location of the current destination, or points of interest. In a preferred arrangement the user may be provided with the ability to adapt the illustrative colour scheme mentioned above so that they can choose a personal colour coding for the markers they want displayed.

In a preferred embodiment the indicators of FIGS. 9a to 9d each include an icon 492 which relates to that used for the corresponding marker (in FIGS. 9a to 9c the icons are roughly identical to those used for the marker, whereas in FIG. 9d the icon used is more representative of the marker), a direction element 494 (in these examples an arrow head) which indicates the direction of the location (with respect to the centre of the displayed map) that is associated with the corresponding marker, and a distance element 496 which provides, in the preferred embodiment, a calculated distance (in this embodiment "as the crow flies"—i.e. in a straight line) between the local environment displayed in the map (preferably the centre of the displayed map) and the marked location associated with the indicator.

In the preferred arrangement the distance element shows the number of miles or kilometres to the corresponding marked location when the marked location is more than one mile or kilometre from the centre of the currently displayed map. The distance element is updated with movement of the device, and when the marked location is less than a mile or kilometre from the centre of the currently displayed map, the distance element shows the distance to one decimal place in miles or kilometres. Whilst an "as the crow flies" distance is only meant to provide a rough indication of the distance between the map centre and the marked location associated with the indicator, it is of course conceivable that the processor could compute the shortest route between the centre of the map and the marked location with which the indicator is associated and display this distance (which more closely represents the distance that the user will have to travel to reach that marker) as the distance element. It is also conceivable that the distance indicator could display the distance in other terms, for example in terms of the amount of time that it might take to travel from the current location to the marked location that is associated with the indicator.

Although not shown in the indicator depicted to the right hand side of FIG. 9d, it is particularly preferred that instead of a direction element 494 there is instead provided a manoeuvre element that indicates the type of manoeuvre required at the next waypoint. For example, if the next manoeuvre should be a left turn, then the manoeuvre element may comprise an arrow with a left-hand bend in the shaft of the arrow. In a particularly preferred implementation, if there is a second waypoint in close proximity to the closest waypoint in the route, then the manoeuvre element may include an icon with two bends so that both waypoints are represented. It will of course be appreciated by persons skilled in the art that the absence of a direction element does not mean that the user is not aware in which direction the next manoeuvre lies, as the waypoint indicator will be (as is later described), in the preferred arrangement, located towards the periphery of the displayed map that is closest to the next waypoint.

As the subtlety of a determined route tends to disappear when the map magnification is substantially reduced, it is preferred that the waypoint indicator disappears when the user selects this magnification level (or indeed a lower magnification level). Similarly, if the GPS fix should be lost, then the waypoint indicator will also disappear. In the preferred arrangement, if a GPS fix should subsequently be reacquired then the waypoint indicator will reappear if the location of the next waypoint is still outside of the displayed map.

In a default mode of operation, the indicators may be displayed for all marked locations that are less than a predetermined distance away (for example 999 miles or kilometres) from the centre of the displayed map. The user may be provided with the ability to set this predetermined distance for one or more of the indicators so that, for example, points of interest within a user selected distance of the displayed map centre are displayed. To avoid cluttering the displayed map with indicators it is particularly preferred that the user may only be permitted to display indicators for a predetermined number of marker types at any given time. It is also preferred that in circumstances where multiple different marked locations exist for points of interest of the same type, such as petrol stations for example, an indicator for only the closest of these marked locations to the currently displayed map is displayed.

In one arrangement the direction element 494 is a dynamic element in that the direction in which the element points (i.e. the orientation of the element) changes as the displayed map changes, for example with movement of the device.

It is also preferred for each of the indicators to be displayed towards the periphery of the displayed map that is closest to the associated marked location, and furthermore for the displayed position of the indicators to change as the device moves. For example, if the vehicle in which the device is located is travelling north and a given marker is due east of the current device position, then the corresponding indicator will be displayed at the right hand periphery of the displayed map. If the vehicle should then turn through a 90 degree left turn, the marked location will then be orientated to the south of the device and as the orientation of the displayed map changes in concert with the changes to the orientation of the vehicle, so the indicator will move from the eastern periphery of the displayed map towards the southern periphery of the displayed map.

In one envisaged mode of implementation the indicators may have the same layout (namely icon, distance element, direction element) irrespective of whether they are displayed on the left or right hand side of the screen. In another envisaged implementation the indicator element layout may reverse as the indicator moves from one side of the display to another. For example on the left hand side of the display the indicator may adopt—as viewed by a user—a direction element/distance element/icon format, whereas for the other side of the display the indicator may adopt an icon/distance element/direction element format.

In order to avoid obscuring displayed map information, it is particularly preferred that the indicators should be configured so as to be partially transparent, to thereby enable the underlying map to be viewed through the indicators. Preferably the degree of transparency is settable by the user according to their preference. It is also preferred for movement of the indicators to be controlled to avoid any other items, such as virtual buttons or other elements (such as a scale or location co-ordinate), that may be displayed on the screen or indeed any other indicators that are being displayed.

Although it is eminently possible for many different indicators to be provided, it is highly preferred—to avoid cluttering the displayed map—that the user is only be able to opt to display one or more of the following indicators: the current GPS position indicator (as depicted in FIG. 9c), the home indicator (as depicted in FIG. 9a), a user defined flag (as depicted in FIG. 9a), and the next nearest waypoint on the route (as depicted in FIG. 9d). Whilst this is preferred, it should be noted that the scope of the present invention is not to be limited only to the display of these indicators, and it will further be understood that a large number of different types of indicators may readily be devised.

Figure 10A:
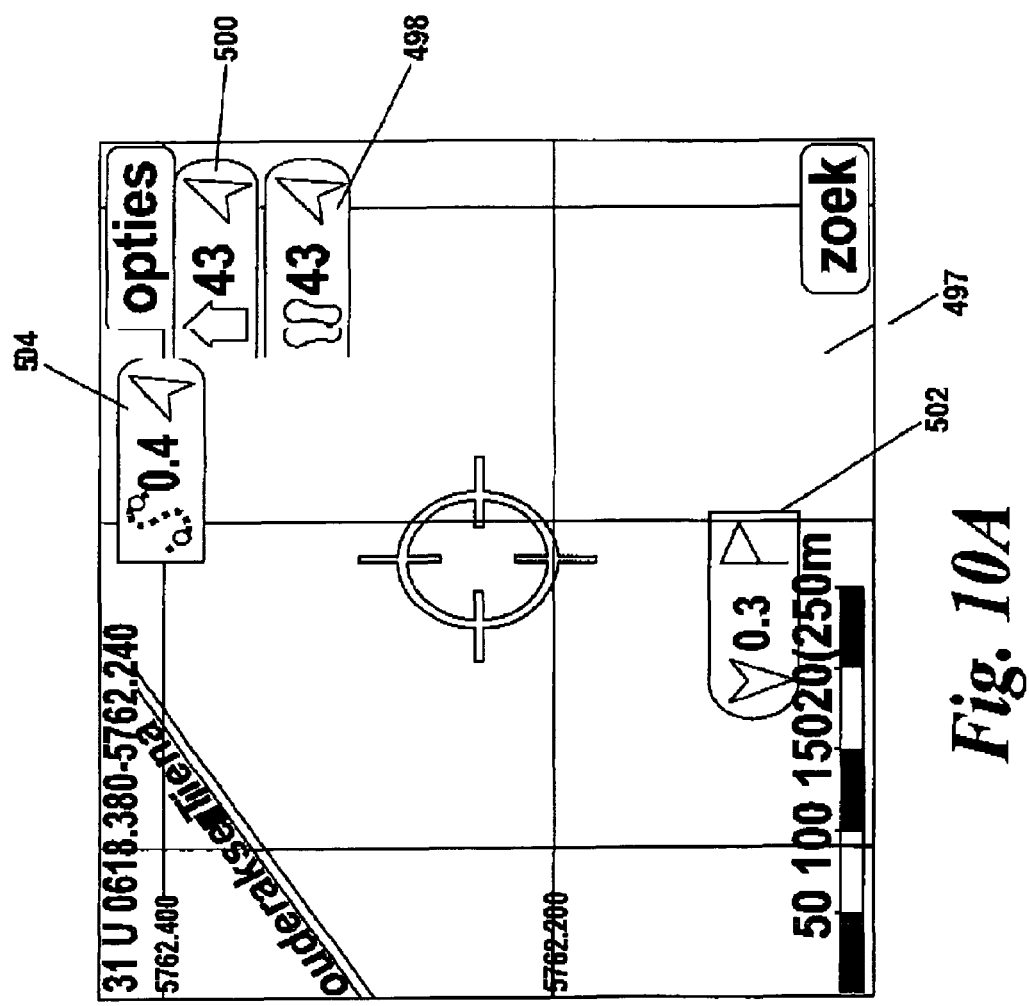
FIGS. 10a to 10d are schematic screenshots of illustrative navigation maps.

Referring now to FIGS. 10a to 10d, there are shown some illustrative screenshots of local environments 497 in which some or all of the foregoing indicators are employed. FIG. 10a is a situation where the marked locations corresponding to: the last GPS fix, the home location, a user defined location and the next waypoint are all outside of the displayed map, and as a result the displayed map includes the GPS fix indicator 498, the home indicator 500, the user defined location indicator 502 and the next waypoint indicator 504.

Figure 10B:
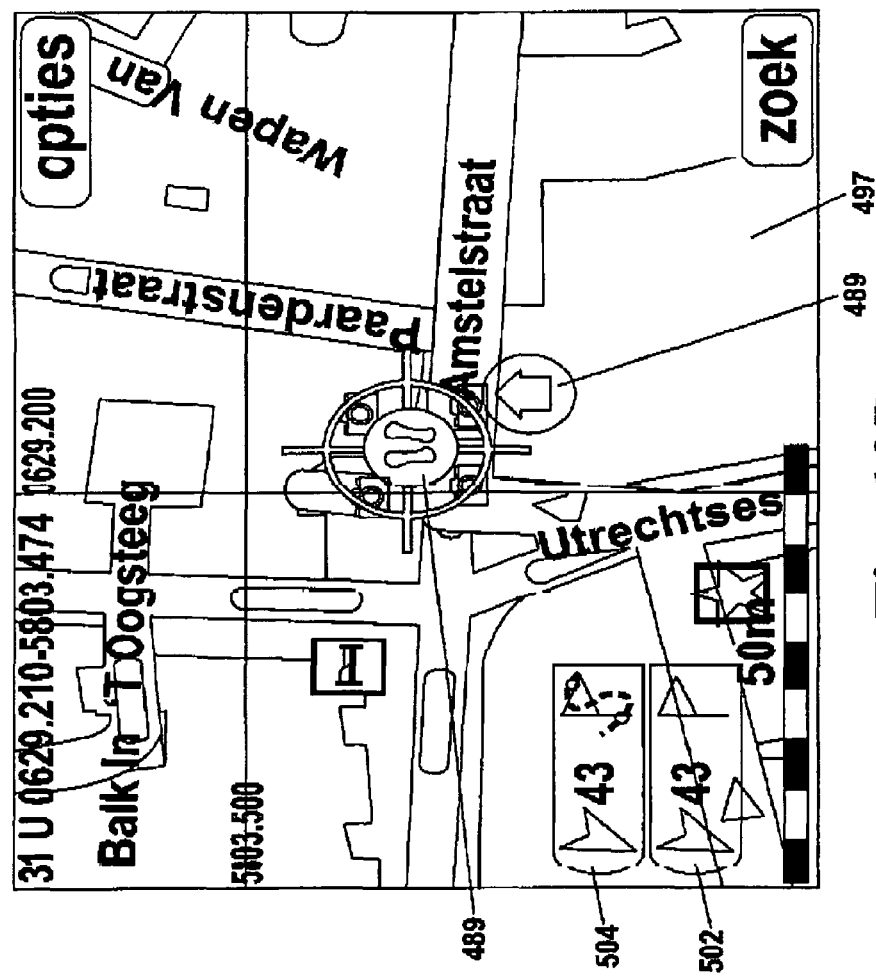

In FIG. 10b, the marked location of the last GPS fix and the home location are both within the displayed map and hence denoted, respectively, by the icons 489 to the left hand side of FIGS. 9c and 9b. The user defined location and the next waypoint location are, conversely, outside of the displayed map and hence represented on the displayed map by the user defined location indicator 502 and the next waypoint indicator 504.

Figure 10C:
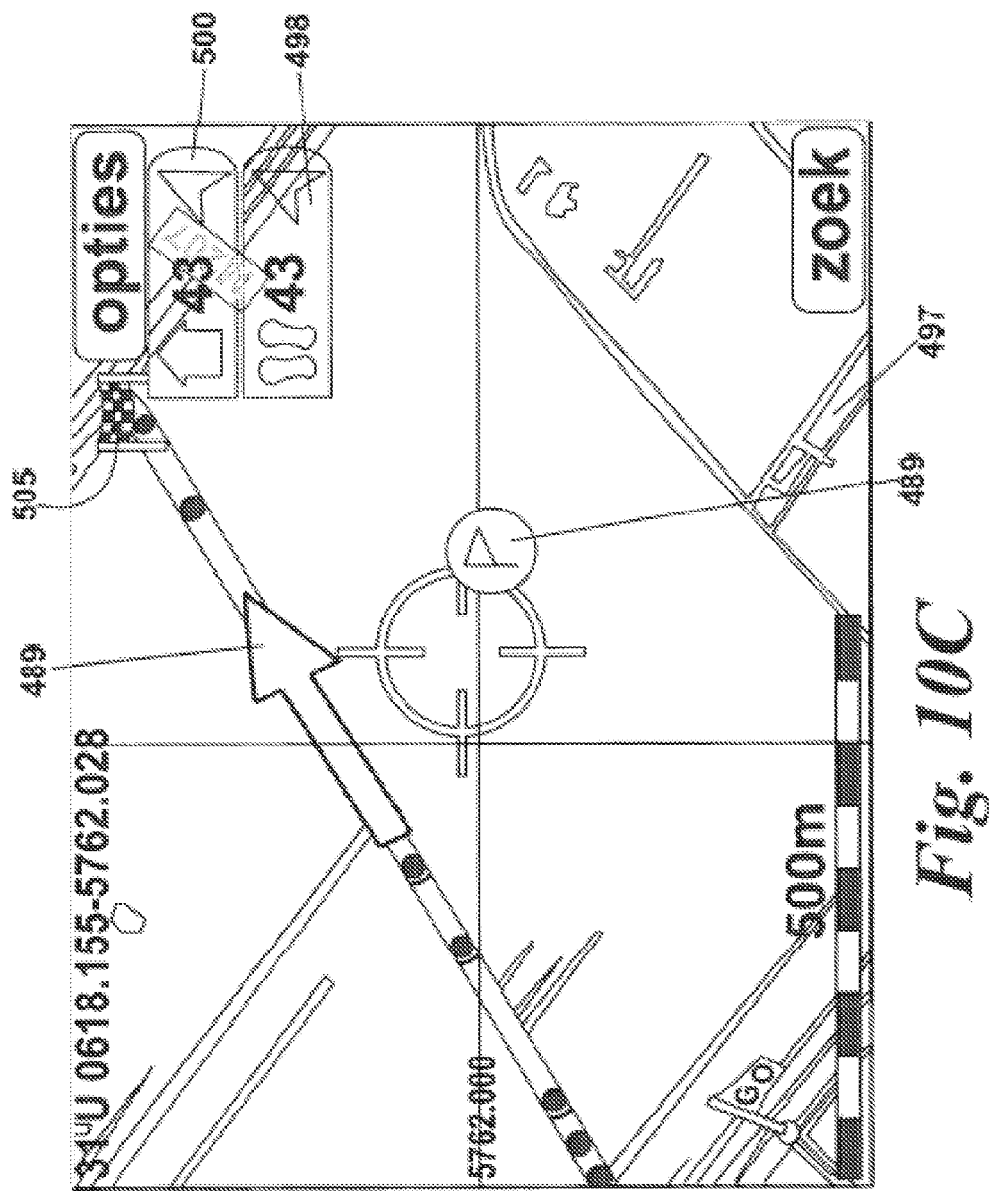

In FIG. 10c, the user defined location is within the displayed map and hence the icon 489 to the left hand side of FIG. 9a is displayed. The home location and last GPS fix locations are both outside of the displayed map and represented, respectively, within the displayed map by the home indicator 500 and the GPS fix indicator 498. In this example, the destination (chequered flag 505) is within the displayed map and as the user need not deviate from the current road to reach that destination the last remaining waypoint of the user's route (which is also within the map) is displayed as a waypoint icon 489 consisting of an arrow with a straight shaft.

Figure 10D:
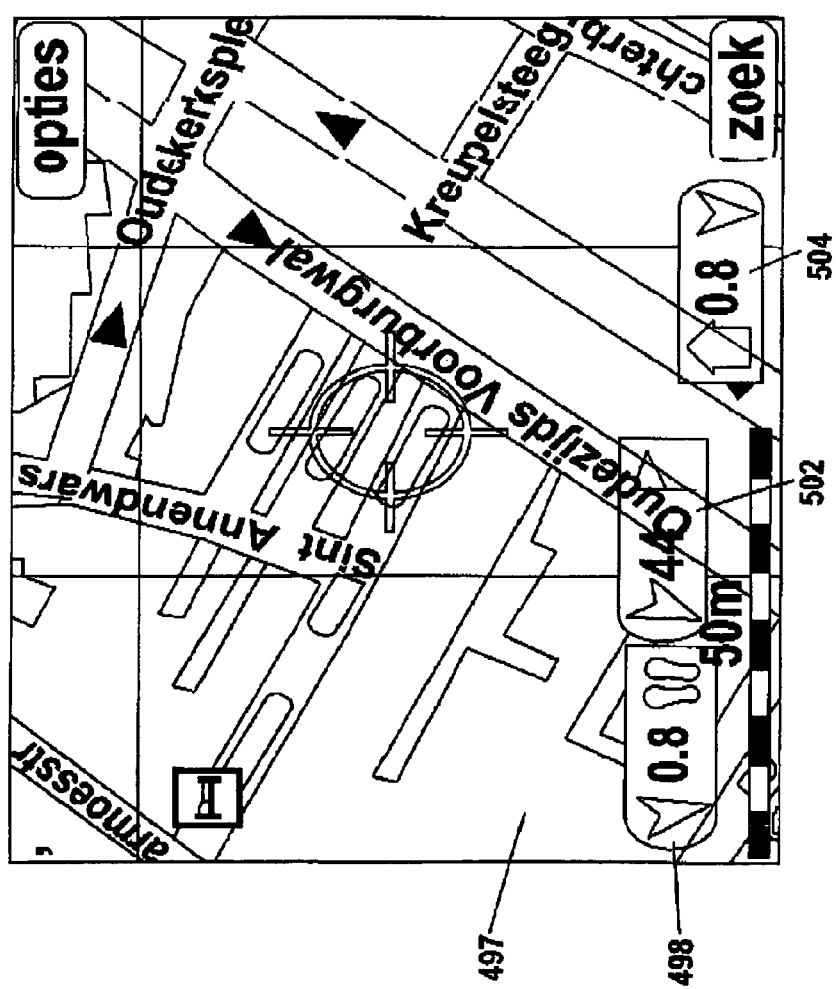

In FIG. 10d, the GPS fix has been lost and the last GPS fix location is outside of the displayed map. To signify this, the GPS fix indicator 498 has changed colour from light blue to grey (although it may be difficult to appreciate this from the accompanying drawings). In this example a user defined location and the home location are both outside of the displayed map and represented, respectively, by the user defined location indicator 502 and the home indicator 500. Furthermore, in this schematic, as the GPS fix has been lost, no waypoint indicator or icon is shown.

Figure 11A:
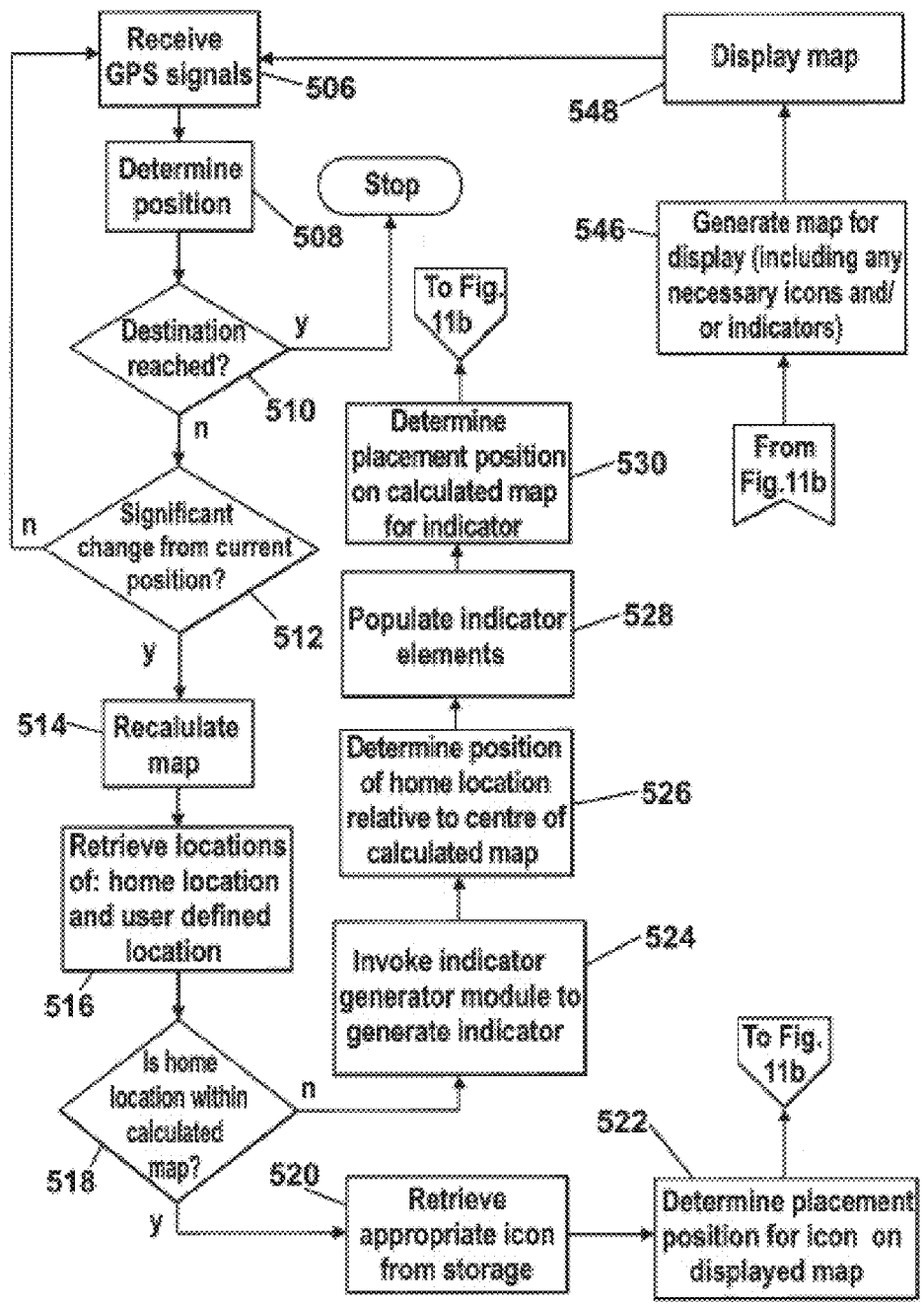
FIGS. 11a and 11b show an illustrative flow diagram depicting the steps of one method by which the teachings of the present invention may be implemented.
Figure 11B:
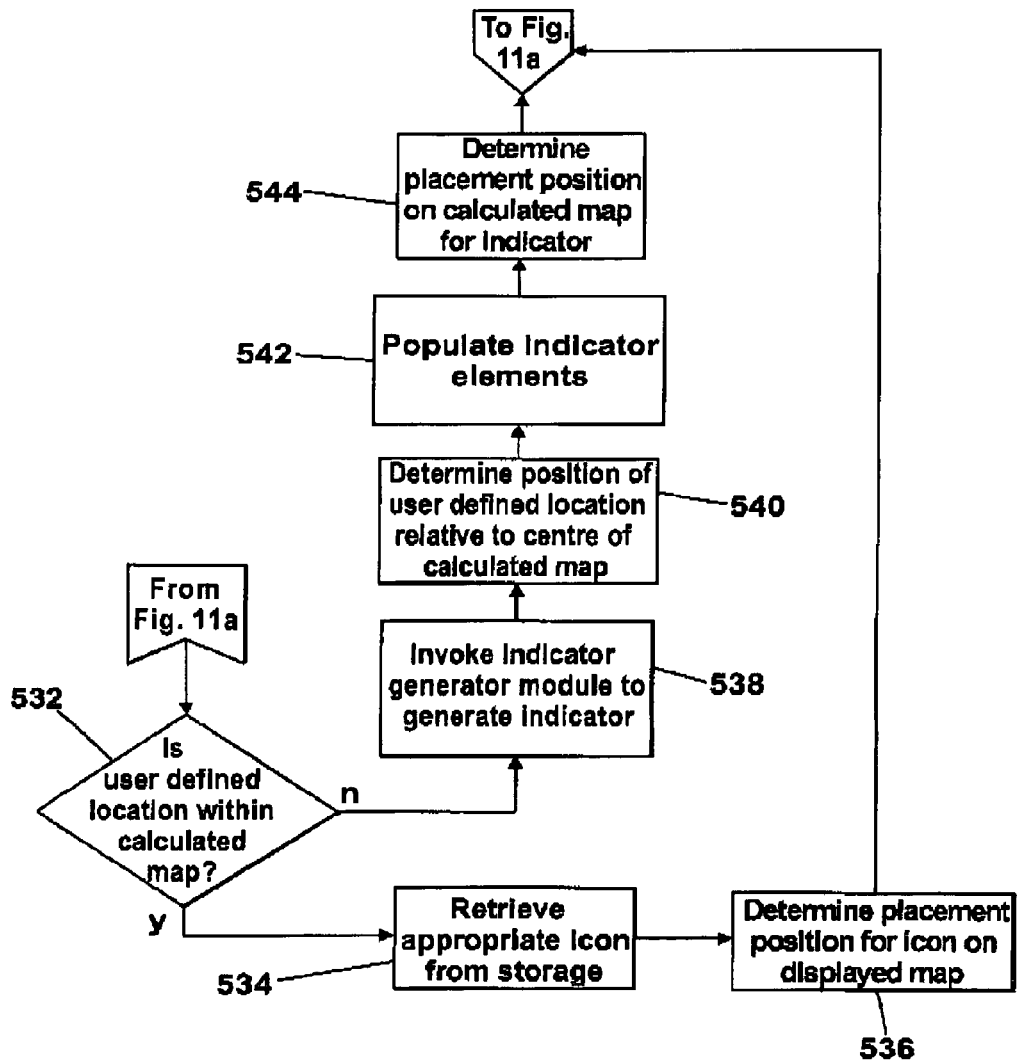

Referring now to FIGS. 11a and 11b, there is a shown a schematic flow diagram illustrating steps of a method by which the teachings of the present invention may be implemented. The method that will now be described assumes that the navigation device 200 is a PND that is being used in a vehicle whilst a user navigates along a route that has previously been calculated. For ease of explanation the method refers to only two locations, a user specified location and the home location, but the method that is schematically illustrated may readily be adopted for other locations.

Similarly, whilst the method that will now be described refers to a navigation device that is receiving GPS signals, it will be apparent that functionality described may equally be employed in a navigation device that is not receiving GPS signals, or indeed in a desktop processing environment where the user is using a desktop computer to plan a route via a route planning website (the like of which are well known) and obtain navigation instructions therefrom (wherein, typically, the display of the navigation device will be local to the user and the processor calculating the route and generating the navigation instructions will be remote from the user and maintained by the organisation providing the website). It will also be apparent, and should be remembered, that the navigation device may comprise a PND, a device built into a vehicle, or indeed any kind of mobile computing platform (such as a mobile telephone, Smartphone, PocketPC™ or PDA).

As shown in FIG. 11a, the navigation device of this embodiment receives GPS signals in step 506, and from these signals determines in step 508 the current position of the device (and hence the vehicle in which the device is travelling). The device then determines in step 510 whether the destination has been reached, and processing terminates if the current position does match that of the destination.

If the current position is not the destination, the device determines whether a significant change in position has occurred (step 512) and if no significant change is detected (for example because the vehicle is not currently moving) then processing reverts to step 506 without redrawing the displayed map. In a preferred embodiment the degree of significance is preset in the device, but it is conceivable that it might be controllable by a user.

If the device is being used without receiving GPS signals (or if a route is being planned via a route planning website) then the notional position of the device (which may or may not tally with the real position of the device) may be determined by calculating the current position of the displayed navigation map and looking for input (for example to scroll the map) for example by a user which signifies a desired change in notional position. Input may, alternatively or additionally, be automatically generated in circumstances where a route preview mode is being implemented.

If a significant change in position is deemed to have occurred, the processor recalculates the map in step 514 and retrieves from storage, for example from memory 230, in step 516 the stored home location and a user defined location.

The processor then determines in step 518 whether the home location retrieved in step 516 is within the bounds of the recalculated map generated in step 514. If the home location is within the map, the processor retrieves the corresponding home location icon from storage (e.g. memory 230) in step 520 and determines in step 522 the position on the map at which the retrieved icon will be displayed.

If the processor determines in step 518 that the home location is not within the bounds of the map, the processor then invokes the indicator generation module 490 in step 524 and the indicator generation module calculates in step 526 the position (i.e. the distance, in miles or kilometres, and the direction) of the home location relative to the centre of the map calculated in step 514. The indicator generation module then populates the abovedescribed elements (icon, distance, direction) of the indicator in step 528 and determines in step 530 the appropriate position on the map for display of the indicator.

Referring now to FIG. 11b, the processor then determines in step 532 whether the user defined location retrieved in step 516 is within the bounds of the recalculated map generated in step 514. If the user defined location is within the map, the processor retrieves the corresponding user defined location icon from storage (e.g. memory 230) in step 534 and determines in step 536 the position on the map at which the retrieved icon will be displayed.

If the processor determines in step 532 that the user defined location is not within the bounds of the map, the processor then invokes the indicator generation module 490 in step 538 and the indicator generation module calculates in step 540 the position (i.e. the distance, in miles or kilometres, and the direction) of the user defined location relative to the centre of the map calculated in step 514. The indicator generation module then populates the abovedescribed elements (icon, distance, direction) of the indicator in step 542 and determines in step 544 the appropriate position on the map for display of the indicator.

Referring again to FIG. 11a, the device then generates in step 546 a map for display and includes within that map, as appropriate, the icons or indicators for locations that are within or outside of the bounds of the displayed map. The processor 210 then controls the display 240 to display the map, and processing reverts to step 506 aforementioned.

It will be apparent from the foregoing that the teachings of the present invention provide an arrangement whereby the position of marked locations may be displayed on a navigation map even though those locations are not within the local environment represented by the map that is displayed.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

Furthermore, whilst it is presently preferred to include three information elements in each indicator, it will be apparent that a fewer number of elements may be provided if so desired. Similarly, whilst certain illustrative information elements have been described herein, other suitable information elements will immediately be apparent to persons of ordinary skill in the art.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A navigation device comprising:
a processor that is configured to generate a navigation map of a local environment;
an input device connected to said processor and configured to receive instructions from a user to display the location of points of interest;
a display controllable by said processor and configured to display said navigation map and location markers for any of said points of interest within said local environment; and
an indicator generation module for generating an indicator for one or more of said points of interest outside of a displayed navigation map,
said processor being responsive to said indicator generation module to control said display to display said navigation map and display any said location markers and any said generated indicators on said navigation map;
wherein the indicator generation module is configured to populate the indicator with a plurality of information elements comprising:
a representation of the distance between a reference point on said displayed navigation map and the location of the point of interest; and
an icon representative of the type of the point of interest.

2. A navigation device according to claim 1, wherein said distance is computed as a straight-line distance between said reference point and said location of said point of interest outside of said displayed navigation map.

3. A navigation device according to claim 1, wherein said reference point is a central location of said displayed navigation map.

4. A navigation device according to claim 1, wherein said indicator generation module is configured to determine, from the position of the point of interest outside said displayed navigation map, the angular orientation of said point of interest with respect to said reference point on said displayed navigation map.

5. A navigation device according to claim 4, wherein said plurality of information elements further comprise a pointer that points towards the point of interest that is outside of the displayed navigation map thereby to indicate the angular orientation of the point of interest with respect to the reference point on said displayed navigation map.

6. A navigation device according to claim 1, wherein said representation of distance comprises a numerical representation corresponding to the number of miles or kilometres between said reference point and said point of interest that is outside of the displayed navigation map.

7. A navigation device according to claim 1, wherein said indicator generation module is configured to generate an indicator that overlies said displayed navigation map.

8. A navigation device according to claim 7, wherein said indicator is at least partly transparent so that the underlying map may be viewed therethrough.

9. A navigation device according to claim 8, wherein a degree of transparency of said indicator is user defined.

10. A navigation device according to claim 1, wherein the processor is configured to control the display to display said indicator at a position superimposed on the navigation map that indicates the direction, relative to a center of said map, in which the point of interest that is outside the displayed navigation map lies.

11. A navigation device according to claim 10, wherein the processor is configured to control the display to display said indicator at a peripheral edge of said displayed navigation map that is closest to the point of interest that is outside of the displayed navigation map.

12. A navigation device according to claim 10, wherein the processor is configured to control the display to change the position at which the indicator is displayed if, on generation of a new map for a new local environment, the direction of the point of interest with respect to a reference point of the new map has changed.

13. A navigation device according to claim 1, wherein the processor is configured to control the display to display said indicator in such a manner that it does not interfere with any other items currently displayed on said displayed navigation map.

14. A navigation device according to claim 1, wherein said indicator is not displayed if the location of said point of interest is more than a predetermined distance from said reference point on said displayed navigation map.

15. A navigation device according to claim 1, wherein the processor is operable to generate a new map of a new local environment.

16. A navigation device according to claim 15, further comprising:
an antenna, and
a receiver for receiving data signals via said antenna,
wherein said processor is configured to determine from said received data signals, a current location of said navigation device and the map generated by the processor is of a local environment that includes said current position, and
said processor is configured to periodically repeat the determination of said current position and to generate said new map if a determined location for said navigation device should differ from said previously determined current position.

17. A navigation device according to claim 15, wherein said processor is responsive to user input to generate a new map of a new local environment.

18. A navigation device according to claim 1, wherein said distance is computed along an optimal travel route between said reference point and said location of said point of interest outside of said displayed navigation map.

19. A navigation device according to claim 1, wherein said input device is further configured to receive input for user generated points of interest.

20. A method of displaying a navigation map on a display of a navigation device, the method comprising:
a processor generating a navigation map of a local environment;
said processor receiving information from a user on an input device of the navigation device to display the location of points of interest;
said processor determining whether said local environment includes any of said points of interest, and retrieving location markers for display for any of said points of interest determined to be within said local environment;
said processor determining whether there are any of said points of interest outside of said local environment;
said processor generating an indicator for display for one or more of said points of interest that are determined to be outside of a displayed navigation map; and
said processor displaying said navigation map and displaying any said location markers and any said indicators on said navigation map;
wherein the step of generating an indicator comprises populating the indicator with a plurality of information elements comprising:
a representation of the distance between a reference point on said displayed navigation map and said point of interest; and
an icon representative of the type of the point of interest.

21. A non-transitory computer readable data storage medium having computer software stored thereon, said computer software comprising one or more software modules operable, when executed in an execution environment, to cause a processor to:
generate a navigation map of a local environment;
receive instructions from a user on an input device of the navigation device to display the location of points of interest;
determine whether said local environment includes any of said points of interest, and retrieve location markers for display for any of said points of interest determined to be within said local environment;
determine whether there are any of said points of interest outside of said location environment;
generate an indicator for display for one or more of said points of interest that are determined to be outside of a displayed navigation map; and
control a display to display said navigation map and display any said location markers and any said indicators on said navigation map;
wherein the step of generating an indicator comprises populating the indicator with a plurality of information elements comprising:
a representation of the distance between a reference point on said displayed navigation map and said point of interest; and
an icon representative of the type of the point of interest.

22. A portable navigation device (PND) comprising:
an antenna;
a receiver operatively coupled to said antenna for receiving GPS data signals from a plurality of satellites;
a memory for storage of map data and points of interest data, said points of interest data defining the location of points of interest;
an interface that is user operable for the input of a start location and a destination location and configured to receive instructions from a user to display the location of points of interest;
a processor operatively coupled to said interface, said receiver and said memory, said processor being configured to:
receive said GPS data signals from said receiver and to process said GPS data signals to determine a current position of said PND in a local environment,
to generate from map data retrieved from said memory a navigation map of the local environment in which said PND current position is located, and
to calculate, from map data retrieved from said memory, a route between said start location and said destination location;
an indicator generation module controllable by said processor to generate an indicator for any of said points of interest for which the associated points of interest data from said memory indicates that the location of said points of interest is outside of a displayed navigation map; and
a display operatively coupled to said processor and controllable by said processor to display:
said navigation map,
a visual representation of said route,
a location marker for any of said points of interest for which the associated points of interest data from said memory indicates that the location of said points of interest is within said local environment; and
any said indicators on said navigation map;
wherein said generating an indicator comprises populating the indicator with a plurality of information elements comprising:

a representation of the distance between said current location of said PND and said point of interest; and
an icon representative of the type of the point of interest.

\* \* \* \* \*